Oct. 30, 1962 A. E. BACHELET 3,061,679

ALARM SIGNALING SYSTEM

Filed Dec. 9, 1959 2 Sheets-Sheet 1

INVENTOR
A. E. BACHELET
BY J. P. Kearns, Jr.
ATTORNEY

INVENTOR
A. E. BACHELET
BY J. P. Kearns, Jr.
ATTORNEY 3,061,679
Patented Oct. 30, 1962

3,061,679

ALARM SIGNALING SYSTEM

Albert E. Bachelet, New York, N.Y., assignor to Bell Telephone Laboratories, Incorporated, New York, N.Y., a corporation of New York Filed Dec. 9, 1959, Ser. No. 858,404
5 Claims. (Cl. 179—5)

Figure 1:
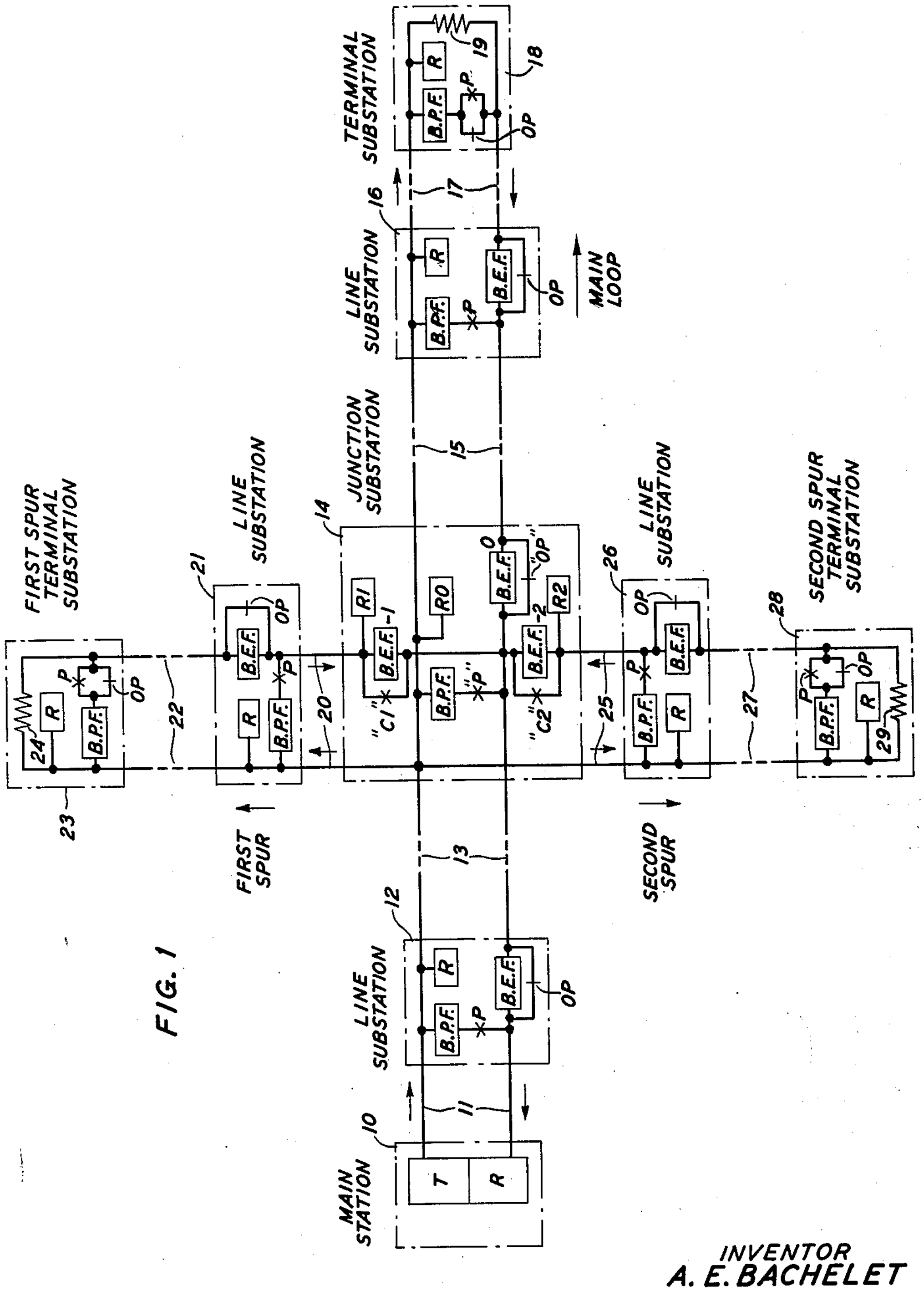

This invention relates to an alarm, control and order wire circuit for an electrical communication system including a single main attended station and a plurality of unattended subsidiary stations and more specifically to improvements in such a circuit whereby the plurality of unattended subsidiary stations can be located along branching communication paths as well as along a main transmission path.

In the copending patent application of A. E. Bachelet, H. H. Haas and N. A. Newell, Serial No. 763,137, filed September 24, 1958, and now Patent 2,919,307 issued December 29, 1959, there is described an alarm, control and order wire signaling system in which a single signaling transmission loop terminated at the main station, linking all intermediate subsidiary stations and closed through a far-end subsidiary station furnishes a path for a voice-frequency tone originating at the main station for the purpose of indicating the normal idle condition. The tone traversing the loop is subject to being blocked by any of the subsidiary stations as a signal to the main station that an alarm condition has occurred in the system. The main station upon recognition of the absence of incoming tone removes outgoing tone momentarily as a seizure signal and then pulses the outgoing tone to cause the alarmed subsidiary station to identify itself and the nature of the alarm condition by reverting pulses to the main station in accordance with a predetermined counting plan capable of interpretation by the main station. The main station in turn automatically registers on a plurality of indicator lamps the numbers assigned to the alarmed subsidiary station and to its alarm conditions. The same signaling transmission loop is adapted for use in signaling any desired subsidiary station, in transmitting certain orders thereto, and as a private line talking circuit to any or all subsidiary stations.

It is an object of this invention to improve the signaling system described in the above-mentioned patent application by increasing its flexibility.

It is a further object of this invention to monitor from the main station subsidiary stations located on spur signaling loops bridged to the main loop at any subsidiary station.

It is a still further object of this invention to prevent non-alarmed loops radiating from a junction substation from responding to pulsing from the main station while the alarmed loop is reporting its alarms.

According to this invention, a junction substation from which one or more spur loops branch from the main loop is arranged to allow signal tone from the main station to pass down the main loop on the outgoing leg and the spur loops bridged thereto but to be returned to the main station on the incoming leg of the main loop only. Incoming tone from the spur loops is normally blocked from the incoming leg of the main loop until such time as an alarm occurs on a spur loop. When an alarm does occur on a spur loop, incoming tone on the main loop is blocked and the other spur or spurs are blocked out from any connection to the incoming leg of the main loop. Upon removal of tone by the main station preparatory to pulsing, the alarmed loop is effectively bridged to the main loop to form a new single closed transmission loop terminating at the main station. Only the alarmed spur loop and the portion of the main loop between the junction subsidiary station and the main station can carry reverted pulses from an alarmed subsidiary station back to the main station.

An important feature of this invention is that on a roll call of all subsidiary stations from the main station spur branches are bridged to the main transmission loop at the junction substation so that all subsidiary stations may revert an appropriate pulse to the main station. Subsidiary stations for this purpose are all numbered in the same series whether on the main loop or a spur loop. There is no duplication of numbers as far as the several loops are concerned. The main station in registering an alarm has and needs no knowledge of the fact that a reporting subsidiary station is on a spur loop, for example. Only the attendant by consulting his system chart can determine this. This is an advantage for it increases the flexibility of the system by permitting the monitoring of additional subsidiary stations without requiring changes in equipment at the main station.

Figure 2:
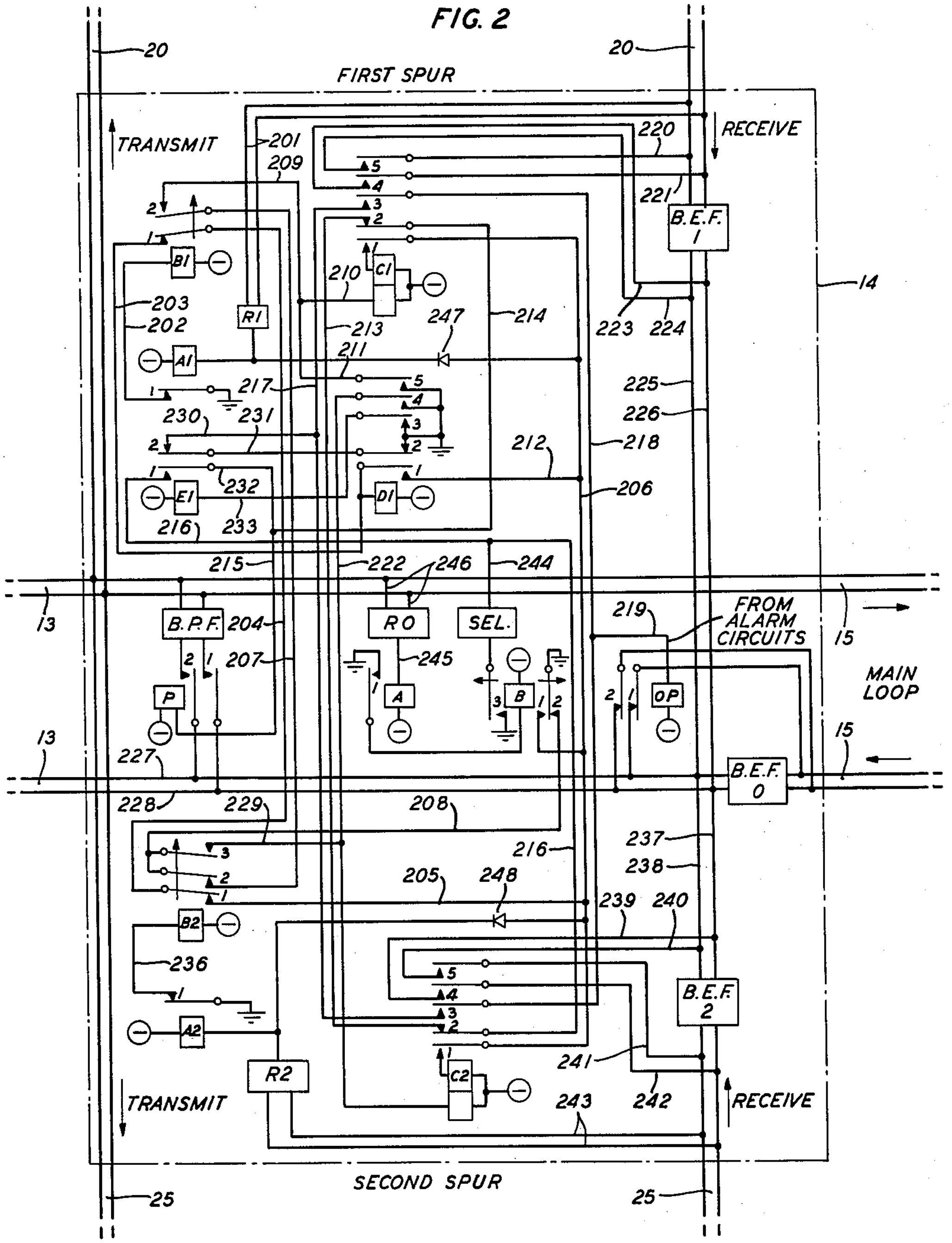

This invention will be more readily understood from the following detailed description together with the accompanying drawing, in which:

FIG. 1 is a simplified block diagram of an alarm signaling system according to this invention which shows two spur loops bridged to the main loop at a junction subsidiary station; and FIG. 2 is a circuit diagram of an illustrative apparatus capable of being employed at a junction subsidiary station according to this invention.

FIG. 1 is diagrammatic of an alarm signaling system which includes a main transmission loop extending east from main attended station 10 and linking by way of line sections 11, 13, 15 and 17 line subsidiary stations 12 and 16, junction subsidiary station 14 and terminal subsidiary station 19; a first spur loop extending north from junction subsidiary station 14 and including line subsidiary station 21 and terminal subsidiary station 23 linked by line sections 20 and 22; and a second spur loop extending south from junction subsidiary station 14 and including line subsidiary station 26 and terminal subsidiary station 28 linked by line sections 25 and 27.

Main station 10 may be substantially the same in apparatus and function as the attended station described in the aforementioned patent. Transmission of outgoing idle tone at 2600 cycles per second and counting and pulsing of identification digits is handled as before. The box labeled T in block 10 of FIG. 1 handles these functions. Inasmuch as the aforementioned patent disclosed a signaling system designed to accommodate only seven subsidiary stations and with the spur branching arrangement of this invention more subsidiary stations may be desirable, main station 10 may be modified to pulse an additional station identification digit in order to monitor an additional seven subsidiary stations. This may readily be arranged by one skilled in the art by providing an additional transfer circuit and grouping the subsidiary stations in multiples of seven stations. The ADD-9 alarm circuits disclosed in the patent application are in general characteristic of the type required.

Apparatus for the recognition of the removal of tone from the incoming line for the reception of reverted pulses, and for the registration of station and alarm information is substantially the same as disclosed in the cited patent. The box labeled R in block 10 of FIG. 1 contains such apparatus.

Each line subsidiary station (hereinafter referred to as a substation) whether on the main transmission loop or on a spur loop is substantially the same as the intermediate substations described in the cited patent. The receivers R bridged to the outgoing lines from the main station translate the absence of tone into a ground condition which controls the operation and release of a line relay to cause operation of the counting circuits in each substation. The bandpass filters BPF bridging the outgoing to incoming lines under the control of a relay P whose make contact is shown are counterparts of the similar filters in the cited patent. These filters allow digit pulses of 2600-cycle tone to be reverted to the main station during the alarm scanning procedure without reverting other voice frequencies. The band-elimination filters BEF controlled by relays OP, one of whose break contacts is shown, are also described in the cited patent. These filters serve to block tone from the main station without interfering with voice transmission when it is desired to signal the main station by voice call. The BPF and BEF–0 filters in the junction substation also operate in the same way.

The terminal substations 18, 24 and 28 are similarly substantially the same as the far-end substation described in the above-referred-to patent. No BEF filter is present in the terminal substations, since the P and OP relay contacts are arranged in parallel to control the insertion and removal of the BPF filter to bridge the outgoing to the incoming lines in the tone-on idle condition and to block the tone during digit pulsing by the main station. The receiver R is the same as its counterparts in the line substations. Resistors 19, 24 and 28 function to terminate the line for order wire purposes. One difference desirable to be incorporated in the terminal substations in this system and not found in the system of the cited patent is the provision for automatically opening the loop at the terminal substations on the seizure signal previously mentioned. This apparatus, involving but one additional relay in terminal substations, is not shown as it is an obvious expedient.

All substations include alarm and order relays as well as counting and pulse-reverting control circuits as in the patent.

The junction substation, however, includes in accordance with this invention additional circuits represented in block 14 of FIG. 1 by the receivers R1 and R2 and by band-elimination filters BEF–1 and BEF–2 controlled by make-contacts C1 and C2. Receiver R1, identical to the receivers R in the other substations, is bridged to the incoming line of the first spur and controls the insertion and removal of band-elimination filter BEF–1 through operation of contacts on a C1 relay as explained in more detail below. Similarly, receiver R2 is bridged to the incoming line of the second spur and controls the insertion and removal of band-elimination filter BEF–2 under the control of the C2 relay.

In FIG. 1 relay contacts are represented for simplicity in detached form by an "×" for a make contact and by a "+" for a break contact in accordance with the usual practice. Contacts at the junction substation are shown in attached form in FIG. 2, however.

In the normal condition when no alarms are standing in the system continuous 2600-cycle signaling tone is present on the outgoing line from main station 10. This tone reaches the receiver R in each substation and holds its output off ground. This means that the OP relay in each substation is released and the related BEF filter is effectively bypassed. At the terminal substations the BPF relay bridges the outgoing to the incoming line. Therefore, the tone returns to the main station receiver on the main loop to hold the output of the receiver R thereat off ground. However, tone cannot return from the spur loops because the output receivers R1 and R2 are also held off ground by the presence of tone on the lines incoming to these receivers. The BEF–1 and BEF–2 filters are normally in the line since they are shunted by normally open contacts of relays C1 and C2.

Upon the occurrence of an alarm on the main loop, for example at substation 16, the OP relay operates as explained in the above-cited patent to insert the BEF filter in the return line to the main station 10. Receiver R at the main station, recognizing the absence of tone on the incoming line, grounds its output and thereby causes the director circuit to remove outgoing tone from the line. Receivers R in all substations, including receivers R0, R1 and R2 at the junction substation, ground their outputs and cause the relay circuits thereof to prepare for the receipt of tone pulses from the main station. The operation of receivers R1 and R2 in junction substation 14 causes the operation of the C1 and C2 relays, respectively, thereby shunting the BEF–1 and BEF–2 filters. Effectively, then, all spur loops are bridged to the main loop and all substations are placed in condition to respond to dial pulsing.

The junction substation operates in the same manner as a line substation in reporting its own alarms.

The operation of the system upon the occurrence of an alarm on a spur loop, however, is quite different. Should an alarm occur at substation 21 on the first spur loop, for example, the OP relay thereat is operated in the same manner as at any other line substation. The BEF filter is allowed to block the tone returning toward the junction substation. Receiver R1 at the junction substation responds to this blocking of tone from the return leg of line 20 by grounding its output and thereby causing the operation of the C1 relay which removes the BEF–1 filter from the return line. Also, the OP, P and C2 relays are affected by the operation of receiver R1. As will be explained in more detail below, the last-mentioned relays have their operating circuits interconnected. The operation of either receiver R1 or R2 alone closes the operating path for the OP relay, opens the operating path for the P relay, and prevents the C2 or C1 relays, respectively, from operating. The operation of the OP relay at this time removes the shunt around the BEF–0 filter and thus blocks the return of tone to the main station. The main station as before recognizes the absence of tone on the incoming line, removes tone from the outgoing line, and begins pulsing of the tone. Receiver R1 in the junction substation remains on ground and the C1, C2, P and OP relays are locked up in the state prevailing at the time of the initial operation of receiver R1 due to the above-mentioned interconnection. No tone pulses can be reverted from the second spur or from the main loop east of the junction substation. The alarmed substation 21 then identifies itself and its alarms in due course in the usual manner. After all alarms are reported and registered at the main station outgoing steady tone is restored to the line and all substation receivers return to their normal off-ground state.

The occurrence of an alarm on the second spur loop causes the same general sequence of operations as described above, except that the first spur loop is effectively blocked out of the system.

FIG. 2 shows the circuit details of the pertinent parts of the alarm signaling system of this invention at the junction substation 14. The incoming and outgoing lines shown in FIG. 1 as single lines are represented as double lines in FIG. 2. The lines 13 to the left of the drawing connect to the main attended station. The right-hand lines 15 continue the main loop to the east. Lines 20 connect to the first spur to the north, and lines 25 connect to the second spur to the south. The directions indicated are, of course, arbitrary. The main and spur loops may in a practical case radiate in any direction.

Relays A, B, P and OP are the line, off-normal, pulse-reverting and tone-blocking relays found in any line substation as disclosed in the cited patent and perform their usual functions in reporting alarms arising at the junction substation itself. In FIG. 2 they are used to perform additional functions in reporting alarms occurring on either of the spur loops. The block designated SEL indicates the selector circuit found in all substations which is strapped to operate the P relay on a given dial pulse count from the main station when the junction substation reports an alarm or responds to a roll call.

Relays A1, B1 and C1 in the upper part of FIG. 2 control the shunting of the BEF–1 filter in the return line of the first spur loop when an alarm occurs on that loop. Relays A2, B2 and C2 perform similar functions for the second spur loop with respect to the shunting of the BEF–2 filter. Relay D1 provides lock-up circuits for the C1 and C2 relays when tone is removed from the system by the main station preparatory to dial pulsing. Relay E1 controls the operating path to the P relay during tone pulsing.

The operation of the circuit when an alarm occurs on the first spur loop is as follows. Just prior to an alarm steady tone incoming on the upper right-hand "receive" lines is blocked from the main loop by the BEF–1 filter. However, tone reaches receiver R1 on lines 201 to hold it in its off-normal condition. As soon as an alarm occurs in one of the substations on the first spur loop, tone is blocked from the "receive" line and receiver R1 places ground on its output lead to relay A1. Relay A1 thereupon operates and removes ground from its contact 1, which had held transfer relay B1 operated. Relay B1 is slow to release as indicated by the vertical arrow across its armatures. Upon release relay B1 opens its contact 1 to break the operating path to relay D1 which includes leads 203 and 204, contact 1 of the normally operated relay B2, and leads 205 and 206. Contact 2 on relay B1 closes the operating path to relay C1 on leads 209, 210 and 207, front contact 2 of the operated B2 relay, and lead 208 to ground through the grounded back contact of relay B. Therefore, relay C1 operates. Front contact 1 of relay C1 closes a lock-up path which is ineffective at this time. Back contact 2 of relay C1 opens the operating path to relay P to prevent the junction substation from reverting tone pulses to the main station should an alarm occur there while the alarm is being reported from the first spur loop. The operating path for relay P is traced from battery indicated by the encircled minus sign through the coil of relay P, leads 215 and 214, contact 2 of relay C1, lead 213, back contact 2 of the released C2 relay, leads 216 and 244, selector circuit SEL and thence to ground on contact 3 of relay B which is not operated at this time.

Closure of contact 3 on relay C1 operates the OP relay from ground on back contact 2 of relay D1 by way of lead 231, contact 2 of relay E1, and leads 230, 217, 218 and 219. Relay OP is normally operated from the alarm circuits of the junction substation. At this time also the operation of relay OP opens by way of its contacts 1 and 2 the shunt around BEF–0 filter, thereby blocking the return of tone on the main loop to the main station.

Contacts 4 and 5 of relay C1 at the same time join leads 220 and 221 on the "receive" side of the BEF–1 filter to leads 223 and 224 on the junction substation side. The return side of the spur loop is thus bridged to the return lines 227 and 228 by way of leads 225 and 226 and substations on the first spur are now able to revert pulses to the main station.

The receiver at the main station responds to the blocking of returning tone by the insertion of filter BEF–0 in the main loop in the usual manner by removing outgoing tone for a timed interval. The absence of tone on all loops causes receivers R0 and R2 to ground their output leads. Relay A2 operates from ground on receiver R2 and thereby removes ground from contact 1. Relay B2 which is normally held operated by this ground by way of lead 236 now begins its release. In the meantime relay A has operated over lead 245 from the grounded output of receiver R0 which is bridged to the outgoing leg of the main loop by way of leads 246. Contact 1 of relay A closes to ground and operates relay B which operates faster than relay B2 can release. Relay C2 would otherwise have operated upon the release of relay B2 from ground on back contact 2 of relay B over lead 208, contact 3 of relay B2, and leads 229 and 222. Now, however, relay B in operating before relay B2 transfers ground from its back contact 2 to its front contact 1 and thus prevents the operation of relay C2. Therefore, filter BEF–2 remains in the incoming leg of the second spur loop.

The now grounded front contact of relay B connects to lead 206 and closes the locking path for relay C1. The BEF–1 filter remains shunted and the first spur loop is still bridged to the return leg of the main loop. Contact 3 of relay B does not affect the circuit at this time. Relay B is also slow to release so that it will not be able to release during the station identification and alarm scan pulses. The system is in such a condition that pulses can be reverted only by substations on the first spur loop and those substations on the main loop located between the main station and the junction substation. The second spur and main loop beyond the junction substation are blocked out.

The main station now transmits tone pulses in the usual way to register the alarms on the first spur loop. In order to prevent the release of the A1 relay during pulsing diode 247 is provided to connect the A1 relay to now grounded lead 206 as shown. Likewise, the A2 relay is prevented from responding to dial pulsing by diode 248 also connected to lead 206. After all alarms have been reported the main station returns steady tone to the line and, assuming the alarm condition on the first spur has been removed, receiver R1 is returned to the off-normal state. The A1 relay releases and operates relay B1. Receiver R0 also returns to the off-normal condition and relays A and B are released. The release of relay B removes locking ground from relay C1, relay C1 releases and the shunt around filter BEF–1 is removed. All circuits are again normal.

A similar sequence of events occurs to operate relays A2, B2 and C2 when a substation on the second spur loop experiences an alarm condition. Receiver R2 is bridged to the "receive" leg of the second spur loop on leads 243 and its output lead is normally off ground. Filter BEF–2 is effective in the "receive" leg to block returning tone from the main transmission loop. When an alarm occurs on the second spur loop, no tone reaches receiver R2, which thereupon grounds its output lead. Relay A2 operates and removes ground from lead 236 by opening its back contact 1. Relay B2 releases, opens the operate path for relay D1 (previously traced) on contact 1, opens the operate path to relay C1 (previously traced) on contact 2, and operates relay C2 from ground on the back contact 2 of relay B over leads 208, 229 and 222 by way of its contact 3.

Relay C2 operated prepares a locking path for itself on contact 1; opens the operating path to the P relay (previously traced) on its contact 2, operates the OP relay on its contact 3 from ground on contact 2 of relay D1, lead 231, back contact 2 of relay E1, leads 230, 217 and 219; and shunts filter BEF–2 by its contacts 4 and 5 and lead pairs 239–240 and 241–242. The operated OP relay blocks tone from returning on the main loop to the main station by removing the shunt on the BEF–0 filter as before. The second spur loop is now bridged to the main loop and the main and first spur loops are locked out. The subsequent removal of tone from the main loop operates relays A and B and ground is placed on lead 206 from the front contact 1 of relay B to lock up relay C2. Only the second spur loop and the portion of the main loop between the main station and the junction substation now are able to revert dial pulses from an alarmed substation.

An important feature of this invention permits the bridging of the spur loops to the main loop on a call originating at the main station. This feature makes it possible for the main station to carry out a roll call of all substations at one time regardless of whether the substation is on the main loop or on a spur loop. As already mentioned, all terminal substations are arranged to open the loop when tone is removed therefrom as a seizure signal. In a roll call as such, each substation as its digit is pulsed prepares to revert the next digit to the main station. Each substation in turn reverts a pulse if it has no alarms outstanding. If all substations respond, the main station is informed that all substations are clear. If all substations do not respond, then a line open condition or a substation in trouble is indicated.

The D1 and E1 relays are instrumental in making this feature possible. When a spur loop is reporting an alarm neither of these relays is operated. However, if the main station initiates a call, it begins by removing tone from the outgoing line for a predetermined interval. All receivers, including the R1 and R2 receivers at the junction substation, respond by grounding their output leads. The B1 and B2 relays in their operated condition immediately furnish an operating path to the D1 relay from the front contact 1 of the B relay. This path extends from ground on contact 1 of the B relay over leads 206 and 205, through the front contact 1 of the B2 relay, over lead 204, through the front contact 1 of the B1 relay and over lead 203 to the operating winding of the D1 relay, the other side of which is permanently connected to negative battery. The release times of B1 and B2 relays greatly exceed the operate time of the B relay. Therefore, there is ample time for the operation of the D1 relay prior to the release of the B1 and B2 relays. The D1 relay immediately locks up through its own contact 1 and lead 212 to ground on lead 206 and so remains operated when the B1 and B2 relays finally release.

The D1 relay operated removes ground from its contact 2, thereby preventing operation of the OP relay by an alarm occurring on either spur loop; operates relay E1 from ground on its contact 3 over lead 233; operates the C2 relay from ground on its contact 4 by way of lead 222; and operates the C1 relay from ground on its contact 5 by way of leads 211 and 210. The BEF–1 and BEF–2 filters are both shunted by operation of the C1 and C2 relays and the spur loops are bridged to the main loop on both transmitting and receiving legs thereof. Relays C1 and C2 lock up through their own contacts 1 to ground on lead 206.

The E1 relay operated returns control of the P relay to the junction substation by closing its contact 1. The P relay can now operate at the proper time from ground on contact 3 of the B relay through the selector or counting circuit SEL, and leads 244, 216, 232 and 215. The opening of contact 2 on relay E1 further breaks the operating path to the OP relay. All substations are therefore in condition to revert pulses to the main station on a roll call. Relays C1, C2, D1 and E1 release upon the release of relay B at the completion of a roll call when steady tone is returned to the main loop by the main station.

In the event of an alarm occurring on the main loop relays D1 and E1 are also operated as above described. On the pulsing of station identification digits the lowest numbered substation in trouble reverts its proper digit and all other substations are locked out from responding to alarm identification digits.

A single spur can be provided from a junction substation by eliminating the A2, B2 and C2 relays and the BEF–2 filter and by strapping leads 204 and 206, leads 207 and 208, and leads 213 and 216. The operation of relays A1, B1, C1, D1 and E1 remains the same as described previously.

Anyone skilled in the art can device means to add further spurs to a junction substation by providing additional A, B and C relays for each additional spur and interconnecting the B relays according to the plan shown in FIG. 2 for the B1 and B2 relays. Likewise, spur loops can branch off from more than one substation on the main loop.

While this invention has been described with reference to a particular embodiment, it will be understood that it is not to be so limited but various modifications may be devised by those skilled in the art without departing from the spirit and scope of the invention.

What is claimed is:

1. In an alarm signaling system having a main attended station, a plurality of unattended subsidiary stations, a main transmission loop including an outgoing leg originating at said main station and an incoming leg terminating thereat and having some of said subsidiary stations bridged across said outgoing and incoming legs, a generator at said main station for applying a signaling tone to said outgoing leg, a director at said main station for monitoring the presence of tone on said incoming leg and for controlling said generator to effect a scan of said subsidiary stations, blocking filters at said subsidiary stations connectable in said incoming leg responsive to an alarm condition thereat for interrupting the return of tone to said main station as an alarm signal, the improvement comprising a junction subsidiary station, a spur transmission loop bridged to the outgoing leg of said main loop at said junction station, others of said subsidiary stations being bridged to said spur loop, a first tone-blocking filter connected in the return leg of said spur loop at said junction station normally preventing tone on said spur loop from returning on the incoming leg of said main loop to said main station, a second tone-blocking filter connectable in the incoming leg of said main loop at said junction station beyond said first filter, and means for connecting the return leg of said spur loop to the incoming leg of said main loop to prepare said spur loop for responding to scanning pulses from said main station comprising detector means in the return leg of said spur loop ahead of said first filter responsive to the removal of tone from said return leg by an alarmed one of said spur loop subsidiary stations for simultaneously connecting said second filter in the return leg of said main loop to block the return of tone to the main station as an alarm signal and shunting said first filter from the return leg of said spur loop to the incoming leg of said main loop.

2. The alarm signaling system defined in claim 1 and a further improvement comprising a second spur transmission loop bridged to said main loop at said junction station, still others of said subsidiary stations being bridged to said second spur loop, a third tone-blocking filter in the return leg of said second spur loop normally preventing tone on said spur loop from returning to said main station, means in the return leg of said second spur loop ahead of said third filter responsive to the removal of tone from said return leg by an alarmed substation on said second spur loop for causing the removal of said third filter from the return leg of said second spur loop and for connecting said second filter in the return leg of said main loop, and further means controlled by said causing means for preventing the removal of said first filter from the return leg of said other spur loop whereby only the second spur loop is bridged to said main loop for reverting interrogating tone pulses to said main station by an alarmed substation on said second spur loop.

3. The alarm signaling system according to claim 2 and control circuits at said junction subsidiary station for locking out one spur loop and the main loop beyond said junction station when the other spur loop experiences an alarm condition comprising a pair of normally operated slow-release relay devices associated with said first and second spur loops, respectively, a pair of normally released relay devices, also associated with said first and second spur loops, respectively, contacts on said normally operated relays in the operating paths of said normally released relays the closure of which cause the operation of said released relays, contacts on said normally released relays for closing a shunt path around said first and third filters, a transfer relay device having a transfer contact to ground and normally released when steady tone is received from said main station but operative upon the removal of tone from said main loop and during the reception of scanning pulses from said main station, an operating path for the first spur loop normally released relay extending from the break side of said transfer contact through a closed contact on the second spur loop normally operated relay and through an open contact on the first spur loop normally operated relay, an operating path for the second spur loop normally released relay extending from the break side of said transfer contact and through an open contact on said second spur loop normally operated relay, said normally released relays being operated independently thereby when the associated spur loop is in the alarm condition, locking paths for each of said normally released relays through the make side of said transfer contact, a further normally released relay having normally closed contacts shunting said third filter, and make contacts on each of said first and second spur normally released relays for closing an operating path for said further relay whenever either of said spur loops is in the alarm condition.

4. In an alarm signaling system having an attended monitor station, a first plurality of unattended monitored stations, a main outgoing transmission line terminated at said monitor station, a main incoming transmission line terminated at said monitor station, means for connecting said first plurality of monitored stations in series along said outgoing and incoming lines, means at a far-end monitored station for connecting said outgoing to said incoming line to form a closed signal transmission loop, a tone generator at said monitor station connected to the termination of said outgoing line for applying a signaling tone thereto, alarm devices at each of said first plurality of monitored stations, a band-elimination filter tuned to the frequency of said tone connectable in the incoming line passing through each of said monitored stations, means located at each monitored station responsive to the operation of any of said alarm devices for connecting the associated band-elimination filter into said incoming line thereby preventing the return of tone to said monitor station; and receiving means at said monitor station connected to the termination of said incoming line for detecting the absence of returning tone and for causing the removal of outgoing tone from said outgoing line as a seizure signal to said monitored stations, the improvement in which at least one of said first plurality of monitored stations is a junction station, one or more spur transmission loops bridged to said main outgoing and incoming lines at said junction station, each of said spur loops comprising an outgoing line directly bridged to said main outgoing line, an incoming line connected to said spur outgoing line at the far end of said spur loop and terminated at said junction station and a further band-elimination filter connecting the incoming terminal of each spur incoming line to said main incoming line at said junction station, a second plurality of monitored stations connected in series on said spur loops, further receiving means at the junction station connected to the incoming line of each spur loop responsive to said seizure signal to shunt said further band-elimination filters and thereby bridge said spur loops to said signal transmission loop in such a manner that said monitor station may signal by pulsing said tone all of said first and second pluralities of monitored stations simultaneously.

5. An alarm signaling system according to claim 4 and auxiliary normally released relay means operated on said seizure signal only when no spur loop includes an alarmed station to hold said further filters in shunted-down condition during tone pulsing from said monitor station and until steady tone is returned to said main outgoing line.

References Cited in the file of this patent

UNITED STATES PATENTS

| | | |
|---|---|---|
| 2,730,703 | Ross | Jan. 10, 1956 |
| 2,919,307 | Bachelet et al. | Dec. 29, 1959 |